(12) United States Patent
Bevan et al.

(10) Patent No.: US 7,147,279 B2
(45) Date of Patent: Dec. 12, 2006

(54) MODULAR COMFORT ASSEMBLY FOR OCCUPANT SUPPORT

(75) Inventors: Michael J. Bevan, Amherstburg (CA); Benson J. Brady, Windsor (CA)

(73) Assignee: IGB Automotive Ltd., Windsor (CA)

( * ) Notice: Subject to any disclaimer, the term of this patent is extended or adjusted under 35 U.S.C. 154(b) by 0 days.

(21) Appl. No.: 11/116,524

(22) Filed: Apr. 28, 2005

(65) Prior Publication Data

US 2005/0200179 A1 Sep. 15, 2005

Related U.S. Application Data

(62) Division of application No. 10/816,701, filed on Apr. 2, 2004.

(60) Provisional application No. 60/476,207, filed on Jun. 5, 2003.

(51) Int. Cl.
*B60N 2/56* (2006.01)
(52) U.S. Cl. .................. 297/180.12; 297/180.13; 297/180.14; 297/284.6; 297/284.5
(58) Field of Classification Search ................ 297/180.1–180.15, 284.5, 284.6
See application file for complete search history.

(56) References Cited

U.S. PATENT DOCUMENTS

| | | | | |
|---|---|---|---|---|
| 4,335,725 A | * | 6/1982 | Geldmacher | 297/284.5 |
| 4,516,568 A | * | 5/1985 | Baxter et al. | 297/284.5 |
| 5,076,643 A | * | 12/1991 | Colasanti et al. | 297/284.6 |
| 5,613,730 A | * | 3/1997 | Buie et al. | 297/180.12 |
| 5,692,952 A | * | 12/1997 | Chih-Hung | 297/180.11 |
| 5,715,695 A | * | 2/1998 | Lord | 297/180.1 |
| 5,897,162 A | * | 4/1999 | Humes et al. | 297/180.12 |
| 5,927,817 A | * | 7/1999 | Ekman et al. | 297/180.14 |
| 6,059,362 A | * | 5/2000 | Lin | 297/284.5 |
| 6,273,810 B1 | * | 8/2001 | Rhodes et al. | 297/180.13 |
| 6,629,724 B1 | * | 10/2003 | Ekern et al. | 297/180.11 |
| 6,722,148 B1 | * | 4/2004 | Aoki et al. | 297/180.13 |
| 6,869,140 B1 | * | 3/2005 | White et al. | 297/180.13 |
| 6,893,086 B1 | * | 5/2005 | Bajic et al. | 297/180.14 |
| 6,988,770 B1 | * | 1/2006 | Witchie | 297/180.14 |
| 2005/0248187 A1 | * | 11/2005 | Brennan et al | 297/180.13 |

FOREIGN PATENT DOCUMENTS

EP   128534 A2 * 12/1984

\* cited by examiner

*Primary Examiner*—Peter R. Brown
(74) *Attorney, Agent, or Firm*—Fildes & Outland, P.C.

(57) ABSTRACT

A method of installing a modular comfort assembly within an occupant support includes the step of providing a modular comfort assembly including a heating element and at least one of a ventilation diffuser bag and a lumbar support system, the heating element, the diffuser bag, and the lumbar support system being modularly attachable to each other on sides thereof. The occupant support includes an outer cover, an internal foam bun, and a frame. The method further includes the step of mounting the modular comfort assembly onto a surface of the foam bun beneath the outer cover.

18 Claims, 4 Drawing Sheets

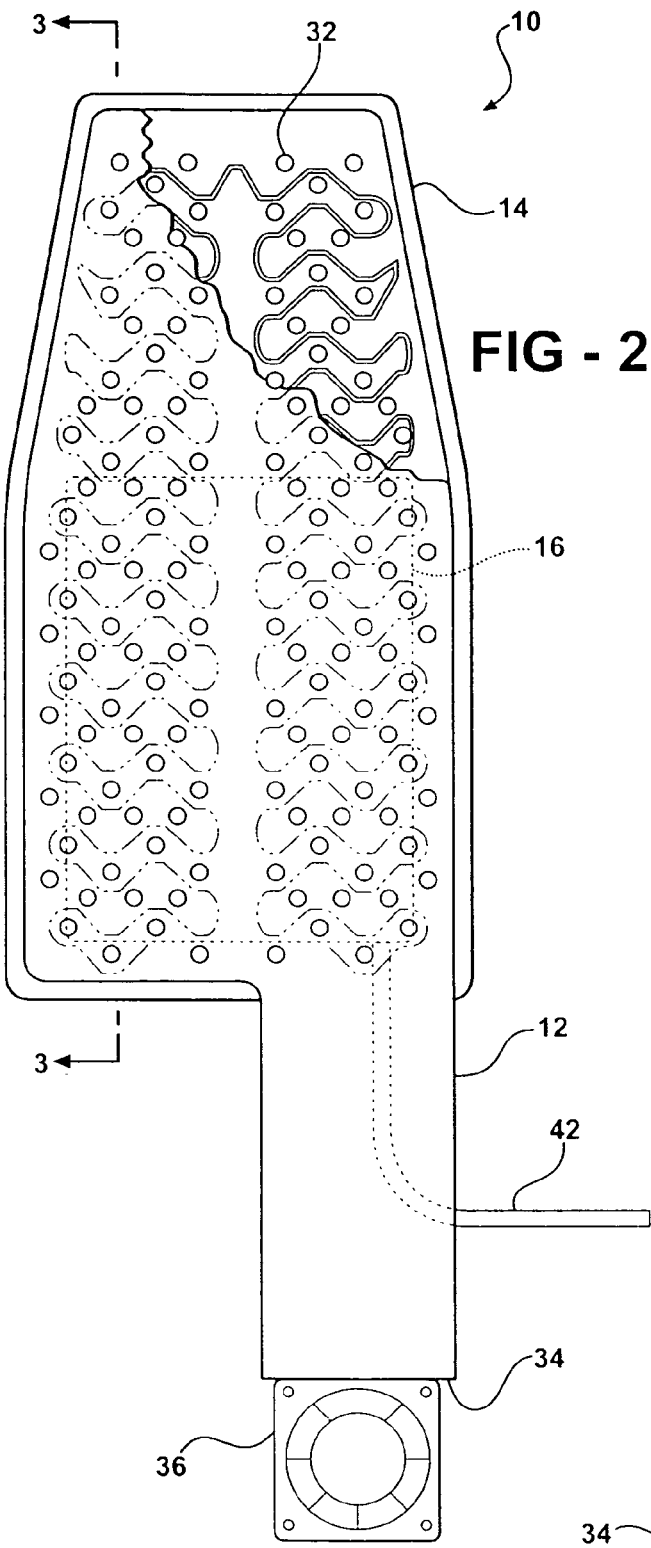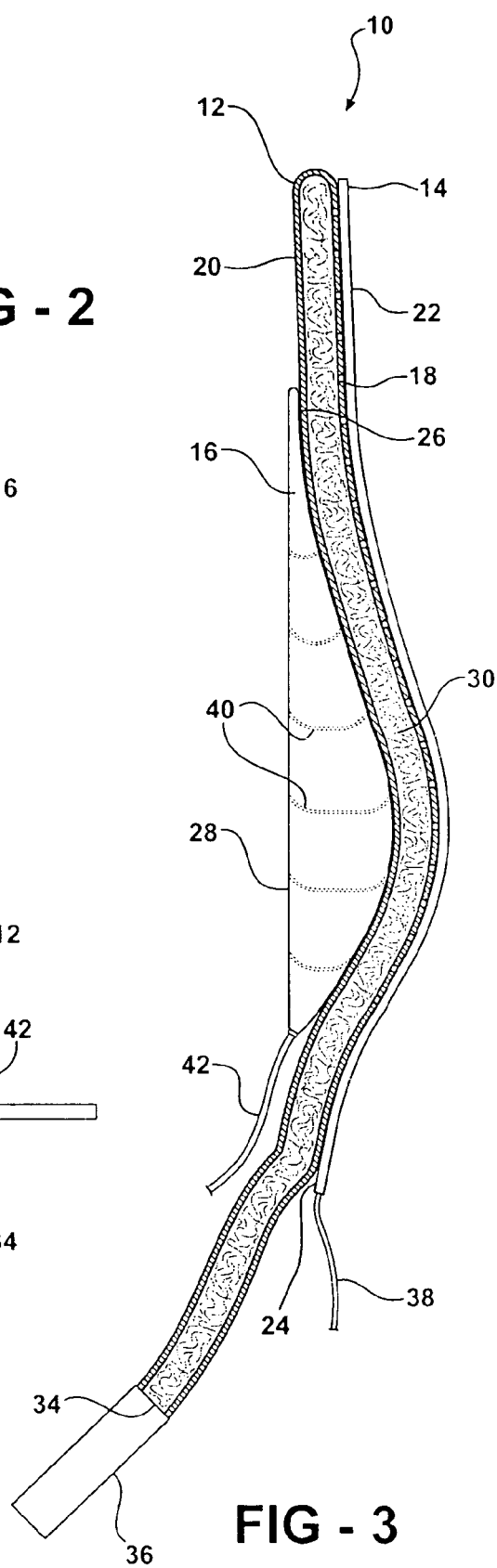

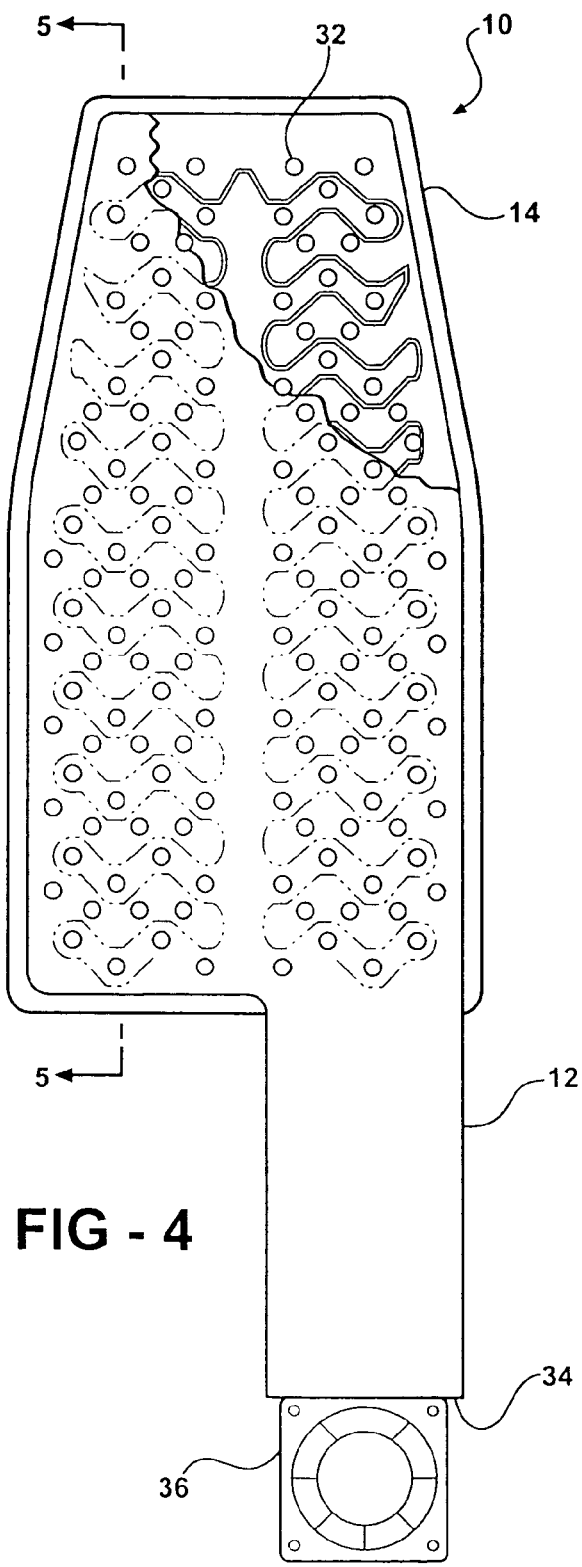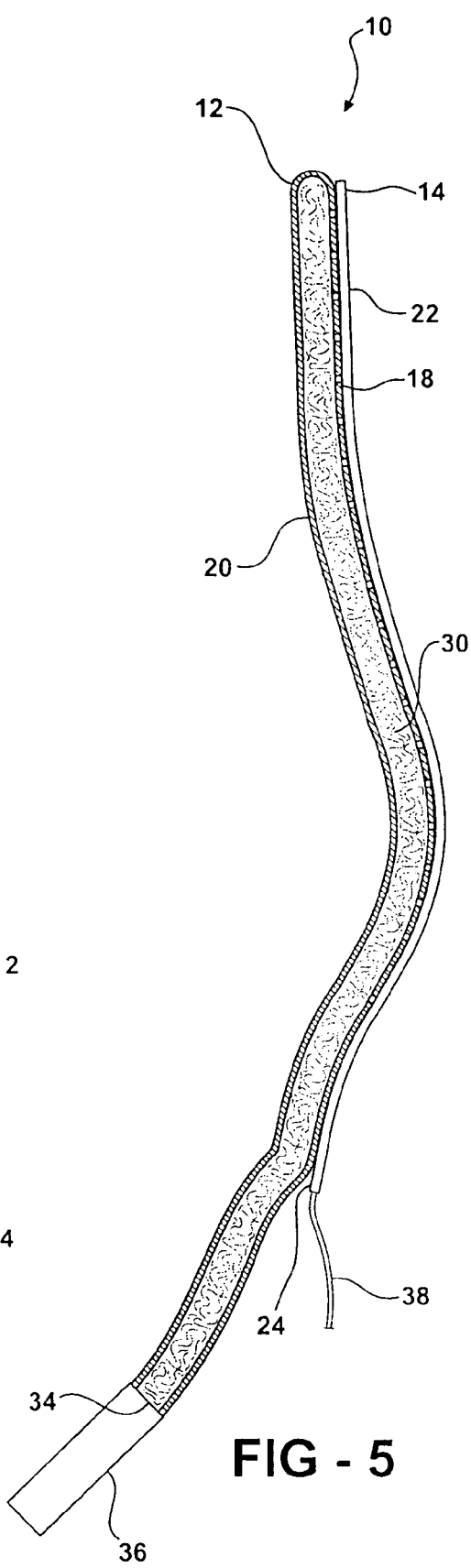

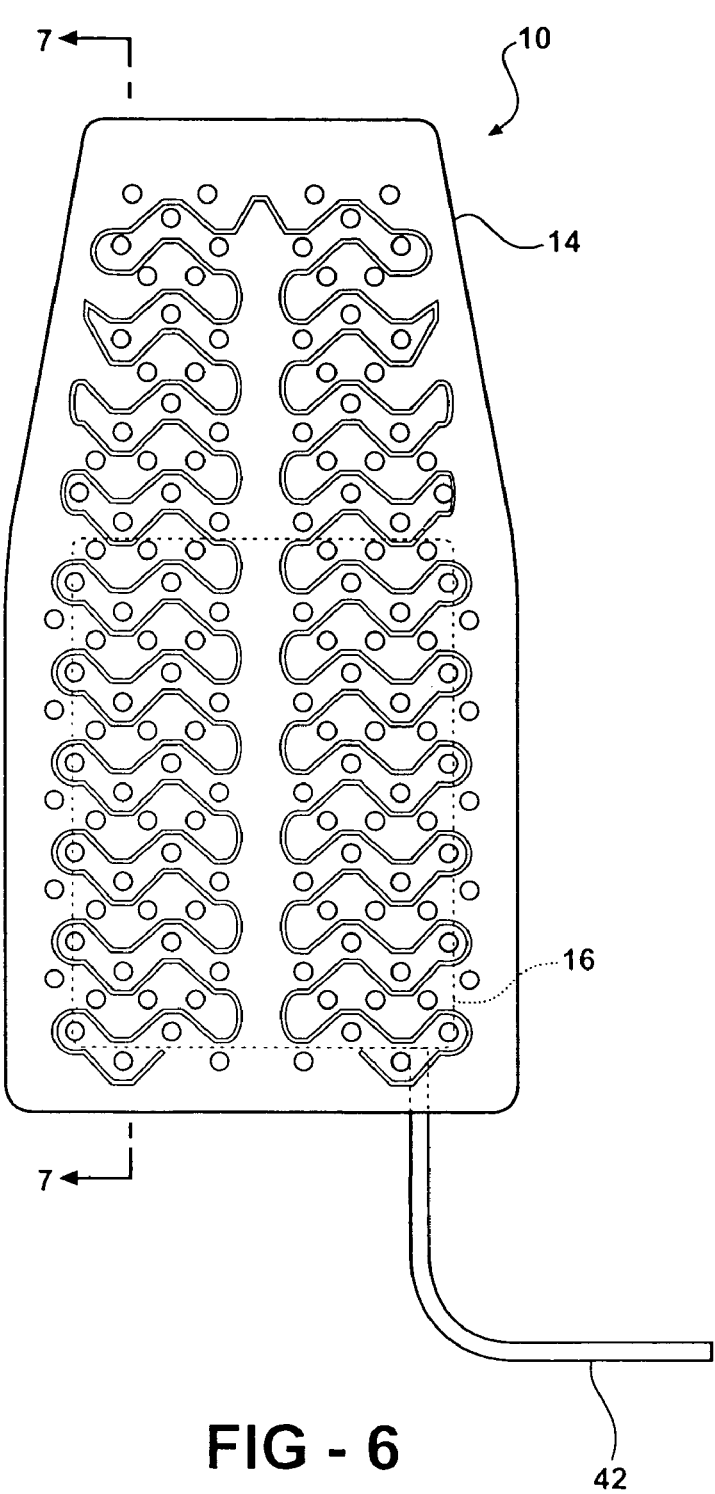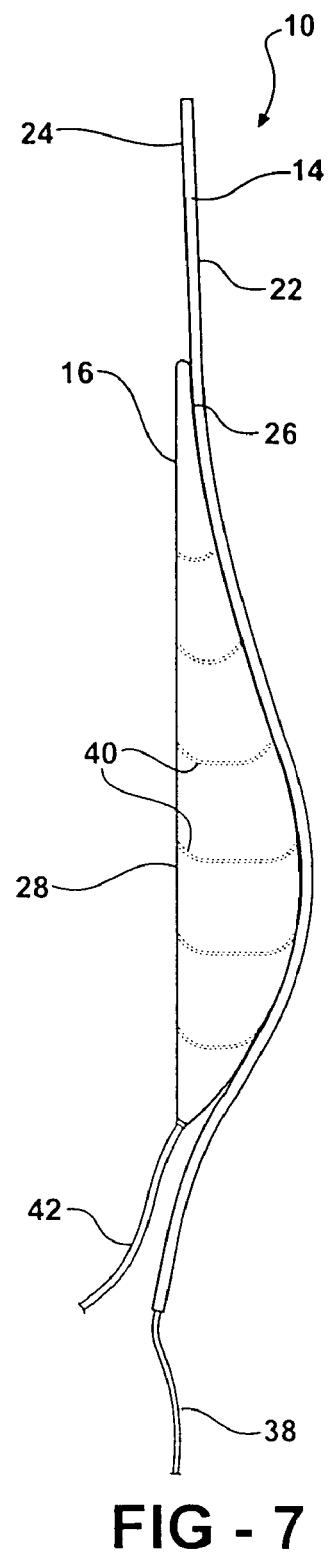
FIG - 6
FIG - 7

MODULAR COMFORT ASSEMBLY FOR OCCUPANT SUPPORT

CROSS REFERENCE TO RELATED APPLICATIONS

This application is a division of U.S. application Ser. No. 10/816,701, filed Apr. 2, 2004, which claims the benefit of U.S. Provisional Application No. 60/476,207, filed Jun. 5, 2003.

TECHNICAL FIELD

This invention relates generally to the field of comfort systems for occupant supports and more particularly to heating, venting and lumbar support systems for vehicle seating.

BACKGROUND OF THE INVENTION

It is known in the art relating to automotive seating comfort systems to install stand-alone heating, venting and/or lumbar systems within the seat as separate units. Such individual application of more than one comfort system into a seat can be difficult and time consuming.

Further, it is known in the art relating to automotive seating comfort systems to heat the seat by moving air over a heating element to warm the moving air and to subsequently heat the seat surface. This is inefficient as there may be heat loss in the moving air.

Furthermore, it is known in the art relating to automotive seating comfort systems to condition the air moving that passes through the ventilation system to cool the vehicle seat. This is also inefficient because it requires the use of a separate air conditioner in the comfort system. The air conditioning unit itself makes the comfort system costlier to manufacture and the use of the unit, once installed, requires a high energy input.

SUMMARY OF THE INVENTION

The present invention provides a modular assembly of comfort systems or subassemblies of heating, venting and/or lumbar support devices adaptable for use with occupant supports such as vehicle seats wherein a heating element, a ventilation "diffuser" and a lumbar support element are integrated into a single assembly. Such a modular comfort assembly has the advantage of allowing for the insertion into an occupant support such as a seat or other of a heating element, a ventilation element and a lumbar support element in one convenient operation. Moreover, the modular assembly has the advantage of being operable by a single control module or separate controllers for each component.

More specifically, a modular comfort assembly in accordance with one embodiment of the invention includes a pneumatic, mechanical, and/or electrical lumbar support system with internal baffles to achieve the desired shape. An air pump is connected to the lumbar support system to allow for inflation and deflation of the system. Pressure sensitive adhesive, Velcro, or other similar material on the back side of the lumber support allows for mounting of the assembly to the surface of the interior foam of the seat. The modular comfort assembly further includes a ventilation "diffuser bag" having air permeable fabric encapsulated within the bag. The bag has an air inlet on one end thereof. A surface of the bag closest to the seat occupant includes perforations for air flow therethrough.

An air mover such as a fan or blower may be connected to the diffuser bag inlet and mounted to the backside surface of the seat cushion foam with pressure sensitive adhesive, Velcro, or other similar material. Alternatively, the air mover may be mounted underneath the seat cushion or any other area in close proximity to the seat. The air mover causes circulation of air through the "diffuser bag" but does not condition or otherwise treat the air. Instead, the movement of air by the air mover through the "diffuser bag" gives the seat occupant the perception of being cool because of the convective effect of air moving over the occupant's body.

The backside surface of the ventilation bag is lined with pressure sensitive adhesive, Velcro, or other similar material for attachment to the front surface of the lumbar support. The modular comfort assembly further includes a heating element that attaches to the front surface of the ventilation "diffuser bag" via pressure sensitive adhesive, Velcro, or other similar material. The surface of the heating element is permeable to communicate ventilating air to the seat occupant, but the heating of the seat via the heating element is independent of the movement of air through the "diffuser bag" and the permeable surface of the heating element.

In another embodiment of the invention, the comfort assembly includes a heating element and a ventilation "diffuser bag." In this embodiment, the back side of the heating element is attached to the front side of the "diffuser bag" via pressure sensitive adhesive, Velcro, or other similar material. The back side of the "diffuser bag" is also lined with pressure sensitive adhesive, Velcro, or other similar material for attachment of the assembly to the foam cushion of the seat. An air mover is connected to the "diffuser bag" to deliver unconditioned air to the ventilation system. The surface of the heating element is permeable to allow for communication of ventilating air to the seat occupant, but the heating of the seat is independent of the ventilation system.

In yet another embodiment of the invention, the comfort assembly includes a heating element and pneumatic, mechanical, and/or electrical lumbar support system. In this embodiment, the back side of the heating element is attached to the front side of the lumbar support system via pressure sensitive adhesive, Velcro, or other similar material. The back side of the lumbar support system is also lined with pressure sensitive adhesive, Velcro, or other similar material for attachment of the assembly to the foam cushion of the seat. An air pump is connected to the lumbar support system to allow for inflation and deflation of the system.

These and other features and advantages of the invention will be more fully understood from the following detailed description of the invention taken together with the accompanying drawings.

BRIEF DESCRIPTION OF THE DRAWINGS

In the drawings:

FIG. 2 is a cutaway elevational view of one embodiment of a modular comfort system including a diffuser bag, a heating element and a lumbar support in accordance with the invention;

FIG. 3 is a sectional view taken along lines 3—3 in FIG. 2;

FIG. 4 is a cutaway elevational view of a second embodiment of a modular comfort system including a diffuser bag and a heating element in accordance with the invention;

FIG. 5 is a sectional view taken along lines 5—5 in FIG. 4;

FIG. 6 is a cutaway elevational view of a third embodiment of a modular comfort system including a heating element and a lumbar support in accordance with the invention; and FIG. 7 is a sectional view taken along lines 7—7 in FIG. 6.

DETAILED DESCRIPTION OF THE INVENTION

Figure 1:
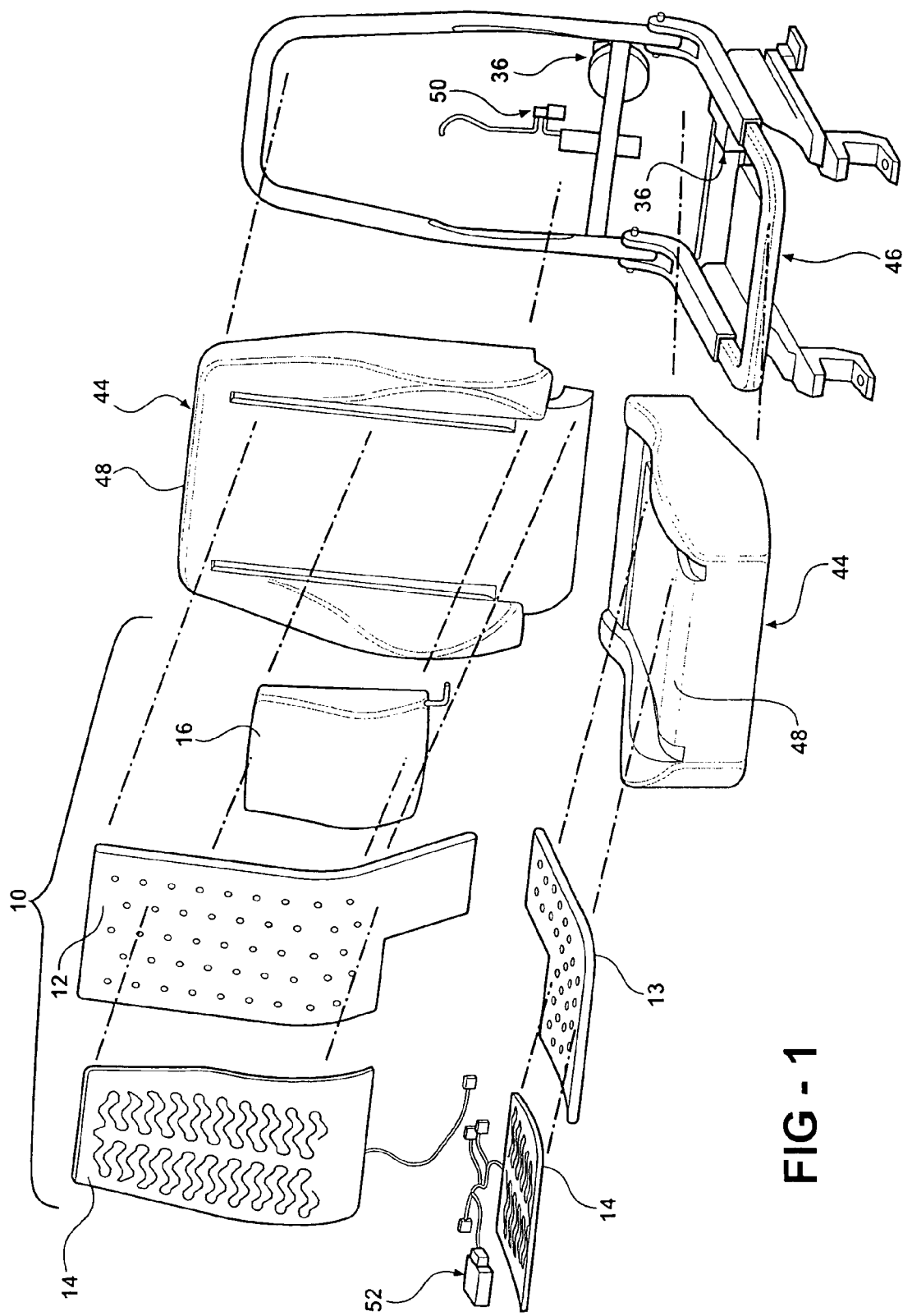
FIG. 1 is an exploded environmental perspective view of a vehicle seating assembly and modular comfort systems or subassemblies of heating, venting, and/or lumbar support devices constructed in accordance with the invention adapted for assembly in the seating assembly.

Referring now to the drawings in detail, numeral 10 generally indicates a modular comfort assembly in accordance with the present invention adapted for installation within an occupant support such as an automotive vehicle seat.

With reference to FIGS. 2 and 3, in a preferred embodiment of the present invention a modular comfort assembly 10 includes a ventilation diffuser bag 12, a heating element 14, and a lumbar support system 16. The ventilation diffuser bag 12 has two main surfaces, namely an A-side 18 and a B-side 20. The heating element 14 also has two main surfaces, namely an A-side 22 and a B-side 24. Likewise, the lumbar support system 16 has two main surfaces, namely an A-side 26 and a B-side 28.

The A-side 18 and B-side 20 of the diffuser bag 12 are lined with pressure sensitive adhesive, Velcro, or another similar, suitable material. The B-side 24 of the heating element 14 and the A-side 26 and B-side 28 of the lumbar support system 16 are also lined with pressure sensitive adhesive, Velcro, or another similar, suitable material. The heating element 14 is thereby attachable on one side (A-side) 18 of the diffuser bag 12 and the lumbar support system 16 is thereby mountable on another side (B-side) 20 of the diffuser bag 12. In this way, the B-side 24 of the heating element 14 faces the A-side 18 of the diffuser bag 12 and the B-side 20 of the diffuser bag 12 faces the A-side 26 of the lumbar support system 16.

The ventilation diffuser bag 12 may include an air permeable fabric 30 encapsulated within the bag. The diffuser bag 12 may also include perforations 32 on the outer A-side surface 18 of the bag and an air inlet 34 on an end of the bag. The diffuser bag may also be constructed of a polyurethane material such as a polyether polyurethane or similar material. An air mover 36 may be connected to the diffuser bag air inlet 34.

The A-side 22 and B-side 24 surfaces of the heating element 14 may be permeable to allow for air to pass through the heating element 14. The heating element 14 itself may be composed of an air permeable material. The heating element 14 may also include a wire harness 38 for connecting the heating element 14 to an electrical source. Further, the heating element 14 may be a two-dimensional heating element having a textile base material, such as, for example, a nonwoven or a textile filament material which acts as a carrier for electrically conductive contacts and heating conductors that touch one another and form an electric connection. Sending of an electric current through the conductive contacts thereby sends a current through the heating conductors, producing heat and warming the heating element. The heating element 14 is sufficiently flexible to fit the contours of the modular comfort assembly 10. The modular comfort assembly 10 may also include a second heating element 15 (see FIG. 1) that is electrically connected to the first heating element 14.

The lumbar support system 16 may include internal baffles 40 and an air inlet 42. An air pump 50 (see FIG. 1) may be connected to the air inlet 42 to allow for inflation and deflation of the lumbar support system 16.

FIGS. 4 and 5 illustrate an alternative embodiment of a modular comfort assembly 10. In this arrangement, the modular comfort assembly 10 includes a ventilation diffuser bag 12 and a heating element 14. The ventilation diffuser bag 12 has two main surfaces, namely an A-side 18 and a B-side 20. The heating element 14 also has two main surfaces, namely an A-side 22 and a B-side 24. The A-side 18 and B-side 20 of the diffuser bag 12 are lined with pressure sensitive adhesive, Velcro, or another similar, suitable material. The B-side 24 of the heating element 14 is also lined with pressure sensitive adhesive, Velcro, or another similar, suitable material. The heating element 14 is thereby attachable on one side (A-side) 18 of the diffuser bag 12. In this way, the B-side 24 of the heating element 14 faces the A-side 18 of the diffuser bag 12. The ventilation diffuser bag 12 and the heating element 14 may also include all of the features detailed above.

FIGS. 6 and 7 illustrate yet another alternative embodiment of a modular comfort assembly 10. In this arrangement, the modular comfort assembly 10 includes a heating element 14 and a lumbar support system 16. The heating element 14 has two main surfaces, namely an A-side 22 and a B-side 24. The lumbar support system 16 also has two main surfaces, namely an A-side 26 and a B-side 28. The B-side 24 of the heating element 14 and the A-side 26 and B-side 28 of the lumbar support system 16 are also lined with pressure sensitive adhesive, Velcro, or another similar, suitable material. The heating element 14 is thereby attachable on one side (A-side) 26 of the lumbar support system 16. In this way, the B-side 24 of the heating element 14 faces the A-side 26 of the lumbar support system 16. The heating element 14 and the lumbar support system 16 may also include all of the features detailed above.

With reference now to FIGS. 1 through 7, installation of a modular comfort assembly 10 in an occupant support is a simple and efficient process. The outer cover (not shown) of the occupant support, in this case an automotive vehicle seat, is opened to unveil the internal foam bun 44 and the support frame 46. The foam bun 44 may also be any other material used for cushioning an automotive vehicle seat. The modular comfort assembly 10 is then mounted to a surface 48 of the foam bun 44 by the pressure sensitive adhesive, Velcro, or other similar, suitable material lining the B-side 28 of the lumbar support system 16 and/or the B-side 20 of the ventilation diffuser bag 12 and/or the B-side 24 of the heating element 14. In the case that the modular comfort assembly 10 includes a second heating element 15 and a second diffuser bag 13, these parts are also mounted to a surface 48 of the foam bun 44 by pressure sensitive adhesive, Velcro, or other similar, suitable material lining the second diffuser bag 13 and/or the second heating element 15.

At this time, diffuser bag air movers 36, which may be either a fan or blower, may be mounted to a backside of the foam bun 44 and the underside of the foam bun 44 by pressure sensitive adhesive, Velcro, or another similar, suitable material. Alternatively, the air movers 36 may also be mounted to the frame in any suitable location near the modular comfort assembly 10, such as on a bottom area or a back area of the frame 46. If the second diffuser bag 13 is not installed, then it is not necessary to mount an air mover to the bottom of the foam bun or bottom of the frame. An air pump 50 connected to the air inlet 42 of the lumbar support system 16 may be mounted onto the frame 46, preferably around the back area of the frame.

Harnesses from the control module 52 are then connected to the lumbar support system 16, the diffuser bags 12, 13 and the heating elements 14, 15. The modular comfort assembly 10 is then enclosed into the occupant support by closing the outer cover (not shown) of the occupant support. This is accomplished by pulling the outer cover back over foam bun 44 and the support frame 48 and re-stitching the outer cover shut.

The modular comfort assembly 10 may be operated and controlled by a single control module 52. Alternatively, the modular comfort assembly 10 may include separate controllers for each component (i.e., the diffuser bag 12, the heating element 14, and the lumbar support system 16) of the assembly.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A method of installing a modular comfort assembly within an occupant support having an internal foam bun and a frame, the method comprising the steps of:
   providing a modular comfort assembly comprising a heating element, a ventilation diffuser bag and a lumbar support system, said heating element, said diffuser bag and said lumbar support system being releasably attachable to each other on sides thereof; and
   mounting the modular comfort assembly onto a surface of the foam bun.

2. The method of claim 1, further comprising the step of:
   mounting a diffuser bag blower to a backside of the foam bun.

3. The method of claim 1, further comprising the step of:
   mounting a diffuser bag blower to the frame of the occupant support.

4. The method of claim 1, further comprising the step of:
   mounting an air pump connected to the lumbar support system onto the frame of the occupant support.

5. A method of installing a modular comfort assembly within an occupant support having an internal foam bun and a frame, the method comprising the steps of:
   providing a modular comfort assembly comprising a heating element and a ventilation diffuser bag that are releasably attachable to each other on sides thereof; and
   mounting the modular comfort assembly onto a surface of the foam bun.

6. The method of claim 5, further comprising the step of:
   mounting a diffuser bag blower to a backside of the foam bun.

7. The method of claim 5, further comprising the step of:
   mounting a diffuser bag blower to the frame of the occupant support.

8. The method of claim 5, wherein said diffuser bag includes a side surface having perforations therein and an opposite non-perforated side, said non-perforated side being supported on the surface of the foam bun and said perforated side being releasably attachable to said heating element.

9. The method of claim 5, wherein the step of providing a modular comfort assembly includes providing a modular comfort assembly further comprising a lumbar support system releasably attachable to a side of said diffuser bag.

10. The method of claim 9, further comprising the step of:
    mounting an air pump connected to the lumbar support system onto the frame of the occupant support.

11. The method of claim 5, wherein said modular comfort assembly is mounted onto the surface of the foam bun by one of a pressure sensitive adhesive and a hook-and-loop fastening means.

12. A method of installing a modular comfort assembly within an occupant support having an internal foam bun and a frame, the method comprising the steps of:
    providing a modular comfort assembly comprising a heating element and a lumbar support system that are releasably attachable to each other on sides thereof; and
    mounting the modular comfort assembly onto a surface of the foam bun.

13. The method of claim 12, further comprising the step of:
    mounting an air pump connected to the lumbar support onto the frame of the occupant support.

14. The method of claim 12, wherein the step of providing a modular comfort assembly includes providing a modular comfort assembly further comprising a ventilation diffuser bag releasably attachable to sides of said heating element and said lumbar support system.

15. The method of claim 14, further comprising the step of:
    mounting a diffuser bag blower to a backside of the foam bun.

16. The method of claim 14, further comprising the step of:
    mounting a diffuser bag blower to the frame of the occupant support.

17. The method of claim 14, wherein said diffuser bag includes a side surface having perforations therein and an opposite non-perforated side, said non-perforated side being supported on the surface of the foam bun and said perforated side being releasably attachable to said heating element.

18. The method of claim 12, wherein said modular comfort assembly is mounted onto the surface of the foam bun by one of a pressure sensitive adhesive and hook-and-loop fastening means.

* * * * *